(12) United States Patent
Horacek et al.

(10) Patent No.: US 7,521,495 B2
(45) Date of Patent: Apr. 21, 2009

(54) INTUMESCENT ELECTRICAL INSTALLATION SYSTEMS AND PROCESSES FOR THEIR PRODUCTION

(75) Inventors: Heinrich Horacek, Linz (AT); Walter Pickhard, Emmenbrücke (CH)

(73) Assignee: Intumex GmbH, Linz (AT)

( * ) Notice: Subject to any disclaimer, the term of this patent is extended or adjusted under 35 U.S.C. 154(b) by 382 days.

(21) Appl. No.: 11/312,372

(22) Filed: Dec. 21, 2005

(65) Prior Publication Data

US 2006/0160926 A1    Jul. 20, 2006

Related U.S. Application Data

(62) Division of application No. 10/389,777, filed on Mar. 18, 2003, now abandoned.

(30) Foreign Application Priority Data

Mar. 19, 2002    (AU)    ................................ A 410-2002

(51) Int. Cl.
  *C08K 5/3492*    (2006.01)
  *C08K 3/04*    (2006.01)
(52) U.S. Cl. ........................ 524/100; 524/291; 524/299; 524/400; 524/404; 524/416; 524/447; 524/449; 524/451; 524/494; 524/495; 524/570; 524/571; 524/586; 524/587
(58) Field of Classification Search ................. 524/100, 524/291, 299, 400, 404, 416, 447, 449, 451, 524/494, 495, 570, 571, 586, 587
See application file for complete search history.

(56) References Cited

U.S. PATENT DOCUMENTS

| | | | |
|---|---|---|---|
| 5,998,503 A | 12/1999 | Jacobson et al. | |
| 6,031,040 A | 2/2000 | Horacek | |
| 6,521,834 B1 * | 2/2003 | Dykhoff et al. | ............... 174/66 |
| 6,706,793 B2 | 3/2004 | Abu-Isa et al. | |
| 6,747,074 B1 * | 6/2004 | Buckingham et al. | ....... 523/179 |
| 6,809,129 B2 | 10/2004 | Abu-Isa et al. | |

FOREIGN PATENT DOCUMENTS

| | | |
|---|---|---|
| CN | 1 261 716 | 8/2000 |
| DE | 34 44 163 | 6/1986 |
| EP | 0 787 784 | 8/1997 |
| EP | 0 990 692 | 4/2000 |
| EP | 1 026 700 | 8/2000 |
| JP | 11-217508 | 8/1999 |

OTHER PUBLICATIONS

S. Jovanovic, "Halogen-free fire-resistant jacketing compound for power cables", Plastika I Guma , 15 (3), 108-112 (1995), Caplus (online) summary, Abstract No. 841302 (1995).

W. Wanzke et al. "Intumescent systems for polyolefines-performance profile in electrical applications", Flame Retardants -98, Proceedings of the Flame Retardants '98 Conference, 8th, London, Feb. 3-4, pp. 195-206 (1998), Caplus (online) summary, Abstract No. 720107 (1995).

* cited by examiner

*Primary Examiner*—Kriellion A Sanders
(74) *Attorney, Agent, or Firm*—Wenderoth, Lind & Ponack, L.L.P.

(57) ABSTRACT

Intumescent, electrical installation systems which comprise an injection molding material of polyolefins or polyimides in combination with intumescent additives, the melting points of the polyolefins and of the polyimides being lower than the intumescence temperature of the intumescent additives.

13 Claims, 2 Drawing Sheets

| Thermocouple No: | Location |
|---|---|
| 1 | On the box |
| 2 | On the switch faceplate |
| 3,4 | On gypsum wallboard over outlet boxes |
| 5,7 | On top of duplex plug |
| 6,8 | On the faceplate |
| 9,11,12,14 | On gypsum wallboard away from boxes |
| 10,13 | On gypsum wallboard over steel stud |
| 15-18 | Inside stud cavity at middepth of wall |

INTUMESCENT ELECTRICAL INSTALLATION SYSTEMS AND PROCESSES FOR THEIR PRODUCTION

The is a divisional of Ser. No. 10/389,777, filed Mar. 18, 2003 now abandoned.

BACKGROUND OF THE INVENTION

Electrical installation systems, such as, for example, conduit boxes, junction boxes, switch boxes, armored boxes, conduits, etc., are produced from a very wide range of materials, depending on the intended use. Materials used to date are steel sheet, aluminum, cast iron, (polyvinyl chloride (PVC), polyphenylene ether/polyphenylene oxide (PPE/PPO), polycarbonate (PC), polystyrene (PS), polypropylene (PP), polyethylene (PE), ABS or polyamide (PA). Depending on the field of use and national provisions, the electrical installation systems must meet certain requirements with respect to fire resistance, thermal stability, chemical stability, electrical properties, such as, for example, volume resistivity, dielectric strength or resistance to tracking, etc.

Thus, for example in Germany and Austria, the following values for flame retardance of electrical installation systems according to VDE 0471/DIN IEC 695 Part 2-1 are applicable: flame retardance for electrical installation systems for flush mounting and in concrete construction must be 650°, that for covers and lids must be 750° C., that for installation systems for mounting cavity walls must be 850° C. and that for terminals and semiflush-mounted conduit boxes for riser cables having 1.5 and 2.5 mm$^2$ copper conductors must be 960° C.

The installation systems available nowadays and comprising PVC, PPE/PPO, PC, PC blend, PP blend, PA are self-extinguishing and non-flame-propagating according to ÖVE-EN 50086 or VDE 0605 in the event of a fire. Installation systems of steel sheet or aluminum must be protected with kneadable, intumescent cements or intumescent inlays to render said systems fire-retardant.

In the USA, the installation systems protected in this manner may not exceed the temperature of 181° C. in a fire test according to ASTM E-119.

However, in the case of fires, for example in the case of cable fires caused by short-circuits, serious consequences can nevertheless easily arise through the formation of dangerous fumes. Particularly in the case of installation systems whose flame retardance is due to a halogen, e.g. chlorine, fire results in the elimination of corrosive gases which can rapidly spread and cause permanent secondary fire damage. In order to avoid in particular the formation of corrosive gases, so-called HFT installation systems have been developed which are halogen-free, flame-retardant, i.e. self-extinguishing and non-dripping and thermally stable from −40° C. to +140° C. in the event of a fire. However, these systems, too, cannot prevent the spread of fumes.

For this reason, it was an object of the invention to provide electrical installation systems which prevent the spread of fumes in a simple manner.

BRIEF SUMMARY OF THE INVENTION

Unexpectedly, this object can be achieved by intumescent, electrical installation systems which are produced by the injection molding process from polyolefins or polyimides in combination with intumescent additives.

DETAILED DESCRIPTION OF THE INVENTION

Figure 1:
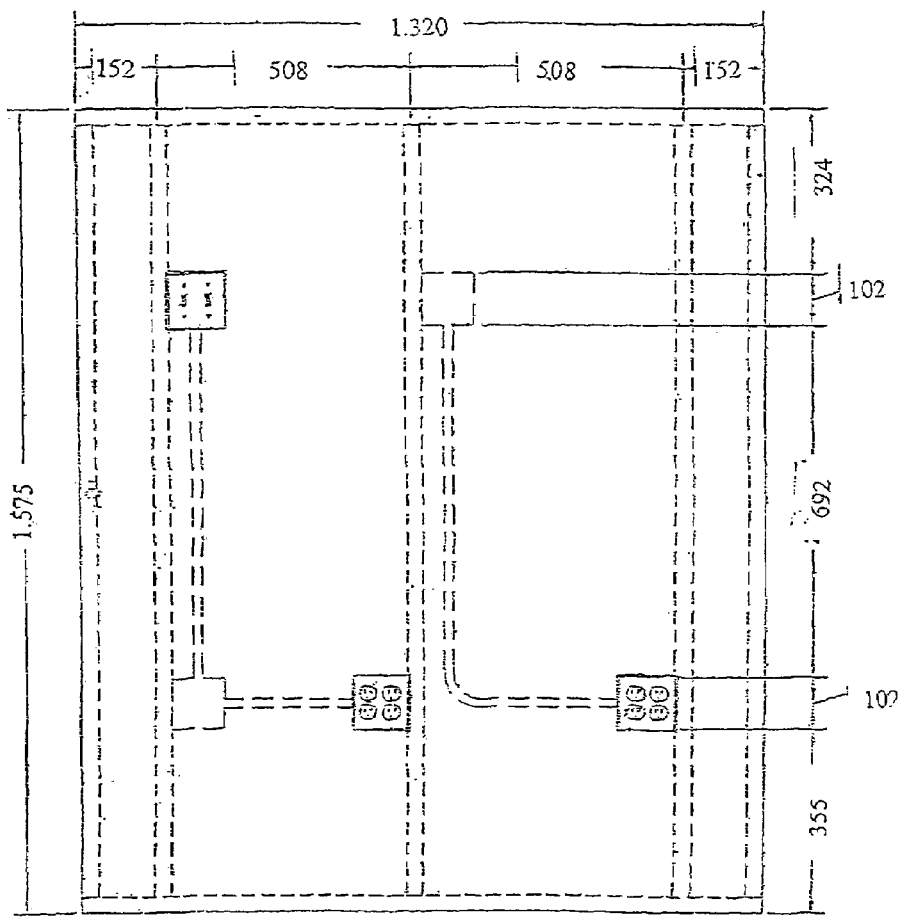
FIG. 1 is a plan view of an intumescent electrical installation system of the present invention showing construction details.

The invention accordingly relates to intumescent, electrical installation systems which comprise an injection molding material of polyolefins or polyimides in combination with intumescent additives, the melting points of the polyolefins and of the polyimides being lower than the intumescence temperature of the intumescent additives.

Electrical installation systems are to be understood as meaning, surface-mounted sockets and boxes, such as, for example, conduit boxes and armored boxes, flush-mounted sockets and boxes, such as, for example, equipment boxes or switch boxes and conduit boxes, and junction boxes, cavity wall sockets and boxes and installation systems for concrete construction.

The abovementioned installation systems may be in the form of conduits, angle boxes, branch-Ts, cross boxes, a combination conduit box/switch box, a double conduit box/switch box, a semiflush-mounted conduit box, a ceiling light connection box, a wall light connection box, a dome box, a double equipment or switch box, a triple equipment box, an equipment conduit box, a junction box/switch box, a transition box, a universal box, etc.

The intumescent, electrical installation systems according to the invention comprise an injection molding material of polyolefins or polyimides in combination with intumescent additives.

Polyolefins used may be thermoplastic polyolefins, such as polyethylene (PE) having a low density (LDPE) to high density (HDPE), preferably HDPE, ethylene-vinyl acetate (EVA) copolymers, ethylene-butyl acrylate copolymers, polypropylene, poly-1-butene poly (methyl-pentene), copolymers of ethylene and octene, ethylene/propylene-diene terpolymers (EPDM) or blends thereof.

HDPE, EVA copolymers or copolymers of ethylene and octene or blends of HDPE and EVA copolymer are preferably used.

Suitable polyimides are those which are present as a low-melting precursor and form highly crosslinked products, such as, for example, bismaleimides by addition reaction under the action of heat.

Bismaleimides which consist of diphenylmethane 4,4'-bismaleimide and methylenedianiline or other aromatic diamines are preferably used. The bismaleimides used should have a melting point below about 200° C.

Commercially available products are, for example, BMI B21 (DSM Fine Chemicals), Kerimide 601 (Ciba), Homide 250 (HOS Technik), etc.

Suitable intumescent additives are ammonium or amino compounds, such as, for example, ammonium polyphosphate, ammonium dihydrogen phosphate, ethylenediamine phosphate, ammonium pentaborate, melamine, dicyandiamide, full phosphoric esters with polyols, dipentaerythritol, pentaerythritol, sugar, dextran, starch, vermicular graphite, waterglass, expanded mica, vermiculite, perlite and mixtures thereof.

Preferred intumescent additives are ammonium polyphosphate, ethylenediamine phosphate, melamine, dipentaerythritol, pentaerythritol, sodium silicate or vermicular graphite or mixtures thereof.

Vermicular graphite is particularly preferably used as an intumescent additive in the case of polyimides, and ethylenediamine phosphate and/or ammonium polyphosphate and/or melamine and/or dipentaerythritol and/or vermicular graphite in the case of polyolefins.

In the case of the injection molding material according to the invention, it should be noted that the melting points of the polyolefins and of the polyimides are lower than the intumescence temperature of the intumescent additives.

The injection molding material according to the invention contains from 20 to 50% by weight, preferably from 30 to 40% by weight, of polyolefin or polyimide and from 50 to 80% by weight, preferably from 60 to 70% by weight, of intumescent additives.

The injection molding material according to the invention can optionally also contain inorganic fillers, such as, for example, kaolin, clays, mica, wollastonite, calcium silicates, titanium dioxide, zinc borate, quartz, zinc oxide, apatite, talc, aluminum phosphates, ATH, $Mg(OH)_2$, chalk, glass fibers, mineral fibers, etc. Preferred inorganic fillers are clays, mica and glass fibers.

If clays or mica are used as inorganic fillers, it is preferable for them to be present as nanoparticles in the mixture of polymer, intumescent additive and filler.

The amount of added filler may be from 0 to 20% by weight, based on the total injection molding material.

In addition, the injection molding materials according to the invention may also contain conventional dispersants, such as, for example, zinc stearate or calcium stearate, glyceryl stearate, pentaerythrityl tetrastearate, cetyl palmitate, ethylenedistearoyldiamide $C_{14}$-$C_{18}$ fatty alcohols, dicarboxylic esters, fatty amines, paraffins, etc., in an amount of from 0 to 5% by weight.

For the preparation of the injection molding material, first a powder mixture or granules of the desired components is or are prepared by simple mixing together or by extrusion.

Thereafter, the intumescent electrical installation system according to the invention is shaped in only one operation in the injection molding process and optionally postcured.

The parameters, such as, for example, temperature, injection pressure and locking force, depend on the respective starting mixture.

In order to ensure that the installation systems according to the invention provide a fume-tight seal in the event of a fire, the material thickness is such that it corresponds to the box volume divided by the product of twice the lateral surface area and the maximum expansion factor, so that the installation system is completely filled with foam by intumescence.

This condition can be represented as a formula as follows:

$$do = V/(Mf \cdot Ef \cdot Kf)$$

do ... Material thickness
V ... Volume of the installation system (socket, distributor box, etc.)
Mf ... Lateral surface area of the installation system
Ef ... Maximum expansion factor of the intumescent additive
Kf ... Compression factor (ratio of max. expansion factor to actual expansion factor)

A compression factor of 2 should preferably be present.

The intumescent electrical installation systems according to the invention have several advantages over installation systems available to date. First, the injection molding material contains no halogens, so that no corrosive gases can form in the event of a fire. Furthermore, in the event of a fire, the installation systems according to the invention provide a fume-tight seal owing to the intumescent additives, so that additional fire protection measures, such as intumescent inlays or cements, are no longer required. The advantages are furthermore achieved in a simple manner in one operation in the injection molding process. Moreover, the installation systems according to the invention have good mechanical properties.

EXAMPLE 1

Null Experiment

A commercial flush-mounted connection box 100 having the dimensions 107×107×57 mm and comprising high-impact polystyrene was mounted in a corresponding recess in a 100 mm Ytong wall so that the cover of the connection box is flush with the Ytong surface. A thermocouple was fastened centrally on the back.

The box had melted after 30 minutes and a temperature of 700° C. was measured at the thermocouple after 2 hours.

EXAMPLE 2

Cylindrical granules of a mixture of
31.8% of ethylene-vinyl acetate copolymer: Evathane 2825 EVA (Elf Atochem)
21.2% of high-density polyethylene: PE FT 7245 HDPE (Borealis)
40.0% of vermicular graphite (Kaisersberg)
7.0% of ethylenediamine phosphate having the dimensions of 4 mm diameter and 4 mm length were produced on a K 30 twin-screw extruder from Werner & Pfleiderer. The extrusion temperature was 150° C. and the throughput was 10 kg/h.

In a second processing step, a connection box 100 having the dimensions 107×107×57 mm was injection molded on an FM 60 injection molding machine from Klöckner Ferromatik. The temperature in the heating zone was 150-160° C. and that in the mold was 40-60° C. The injection pressure was 10 bar.

The connection box having a mean material thickness of 2.5 mm was closed by means of a steel sheet cover. This arrangement was mounted in a corresponding Ytong wall recess. The side with the steel sheet cover was installed facing the fire in the furnace.

A thermocouple for temperature measurement was mounted on the back of the connection box. In the course of the fire test, the connection box became completely filled with foam. The temperature on the back panel after 2 hours was 300° C.

Test specimens were produced from another connection box and the mechanical properties in the tensile strength test according to DIN 53 455 and the expansion factor at 300° C. and in the course of 30 minutes were determined. The values are shown in table 1.

A round connection socket having the dimensions 70 mm diameter and 36 mm height were injection molded from the same granules and likewise mounted in a 100 mm thick Ytong wall in a corresponding circular recess, closed with a steel sheet cover and tested in the furnace. After 2 hours, the back panel reached a temperature of 320° C.

EXAMPLE 3

A powder mixture comprising
45% of BMI B21 bismaleimide (DSM Fine Chemicals)
40% of vermicular graphite (Kaisersberg)
15% of clay 610 (Bischitzky)

and having a bulk density of 35 g/l was prepared.

A connection box was injection molded on a conventional injection molding machine for heat-curable plastics, having an L/D ratio of 15 and a compressionless screw with a pitch of 0.8, at a screw speed of 40 rpm.

The temperatures were 50-60° C. in the feed zone, 50-60° C. in the compression zone, 100-110° C. in the discharge zone and 230° C. in the mold. The injection pressure was 600 bar.

The postcuring was effected in 8 h at 200° C.

The mechanical properties are shown in tab. 1 and the fire behavior and the back panel temperature of 280° C. are shown in tab. 2.

Figure 2:
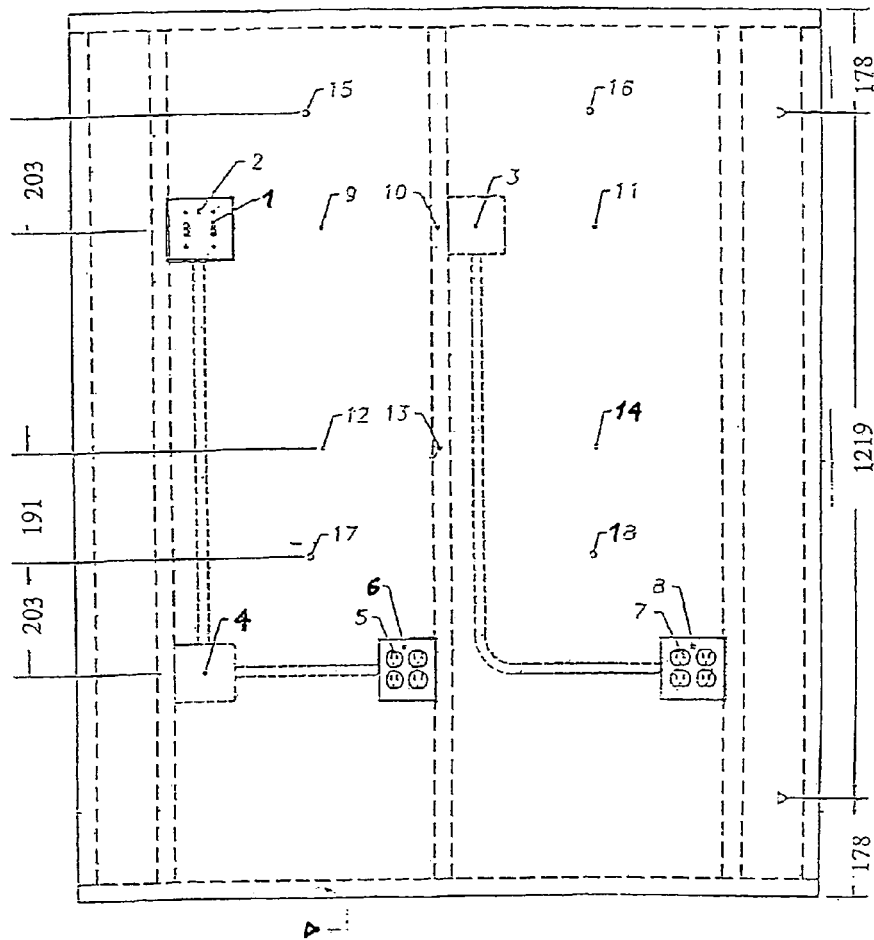
FIG. 2 is a plan view of another intumescent electrical installation system of the present invention showing thermocouple locations.

A US distributor box having the dimensions 100×100×50 mm was likewise injection molded in order to be able to subject it to the UL test according to the setup of FIGS. 1 and 2. 180° C. was not exceeded in the course of 2 hours. To ensure that the material intumesces only in an inward direction, a glass fabric tape is placed around the box.

In FIGS. 1 and 2, construction details are in mm.

In FIG. 1, the lower edge is the unexposed surface. Steel studs 1.575 mm×1.320 mm, 9 mm deep. On both sides faced with two layers of gypsum wallboards 2×16 mm=32 mm.

In FIG. 2, the thermocouple locations are as follows:

| Thermocouple No.: | Location |
|---|---|
| 1 | On the box |
| 2 | On the switch face plate |
| 3, 4 | On gypsum wallboard over outlet boxes |
| 5, 7 | On top of duplex plug |
| 6, 8 | On the faceplate |
| 9, 11, 12, 14 | On gypsum wallboard away from boxes |
| 10, 13 | On gypsum wallboard over steel stud |
| 15-18 | Inside stud cavity at middepth of wall |

EXAMPLE 4

A powder mixture comprising

50% of BMI B 21

35% of vermicular graphite (Kaisersberg)

15% of 3 mm Vetrotex 355 glass fibers (Vetrotex) was prepared.

Round connection sockets and polygonal US distributor boxes were produced on the injection molding machine of example 3 under the same processing conditions. The corresponding data are shown in tab. 1 and 2.

EXAMPLE 5

A powder mixture comprising

45% of BMI B 21

40% of vermicular graphite

15% of nanodisperse clay EXM 784 from SÜD-Chemie AG and having a bulk density of 0.4 g/cm3 was prepared and was processed on an injection molding machine from Klöckner Ferromatik to give moldings. The screw speed was 45 rpm and the temperatures for the injection unit were 55° C. in the feed zone, 55° C. in the compression zone and 110° C. in the discharge zone. The mold temperature was 250° C. An injection pressure of 500 bar and an after-pressure of 500 bar were applied. The postcuring was effected at 200° C. in the course of 8 h. The fire behavior and the mechanical properties of round and rectangular connection boxes are shown in tables 1 and 2.

EXAMPLE 6

42.1% of a copolymer of ethylene and octene: Exact Dextra 2M003 Elastomer (DSM)

42.1% of vermicular graphite (Kaisersberg)

10.5% of clay 610 (Bischitzky)

5.3% of Exolit 422 ammonium polyphosphate (Clariant) were processed on a ZSK 30 to give granules. Rectangular connection boxes were then injection molded on an injection molding machine at 15 bar and at a feed zone temperature of 150° C. and a mold temperature of 40° C.

The wall thickness was once again 2.5 mm. In the fire test of tab. 2, once again complete foam-filling of the box was observed. The back panel temperature after 2 hours was 280° C.

EXAMPLE 7

Granules were produced from a mixture of

40% of a copolymer of ethylene and octene: Exact Dextra 0203 Elastomer (DSM)

40% of vermicular graphite

10% of china clay

10% of Amgard NK ethylenediamine phosphate (Albright and Wilson)

on a ZSK 30 and were then injection molded to give round and polygonal distributor boxes.

EXAMPLE 8

Granules having the following composition were produced by means of extrusion:

40% of ethylene-polyvinyl acetate Mowilith D 200 EVA (Clariant)

30% of Exolit 422 ammonium polyphosphate (Clariant)

15% of melamine (BASF)

15% of dipentaerythritol (Perstorp)

The extrusion temperature was 200° C. In a second operation, round connection sockets having a diameter of 70 mm and a height of 35 mm were injection molded at 90° C.

These were closed with a steel sheet cover and tested in a 100 mm thick Ytong wall in a furnace. The steel sheet cover was on the cold side. A thermocouple indicated the temperature of the cover. After 2 hours, 350° C. was reached.

TABLE 1

Mechanical properties

| Example | Tensile strength MPa | Elongation % | Modulus of elasticity MPa | Expansion under load 550° C./30 min (5 g/cm2) |
|---|---|---|---|---|
| 2 | 4.5 | 8.0 | 200 | 16 |
| 3 | 50 | 0.5 | 6000 | 14 |
| 4 | 30 | 0.4 | 7000 | 15 |
| 5 | 40 | 0.3 | 6500 | 15 |
| 6 | 3 | 12.0 | 175 | 15 |
| 7 | 5 | 5.5 | 450 | 16 |
| 8 | 4 | 10.0 | 200 | 17 |

TABLE 2

Fire behavior of connection boxes and connection sockets

| Example | Connection box/socket Back panel temperature (° C.) | Connection box/socket Degree of foam-filling (%) | UL test (min) |
|---|---|---|---|
| 1 | 600/— | 0/— | |
| 2 | 300/320 | 100/100 | |
| 3 | 280/— | 100/— | >120 |
| 4 | —/300 | 100/100 | >120 |
| 5 | 290/— | 100/— | >120 |
| 6 | 280/— | 100/— | |
| 7 | 270/— | 100/— | |
| 8 | 320/— | 100/— | |

The invention claimed is:

1. An injection molded intumescent, electrical installation system, which is formed from an injection molding material consisting of a) 20-50% per weight of a polyimide formed from a bismaleimide or aromatic diamine b) 50-80% per weight of vermicular graphite as intumescent additive, c) 0-20% per weight of inorganic fillers and d) 0-5% per weight of dispersants 2. The injection molded intumescent, electrical installation system as claimed in claim 1, wherein the polyimide is formed from a low-melting bismaleimide and is highly crosslinked by addition reaction under the action of heat.

3. The injection molded intumescent electrical installation system as claimed in claim 1, wherein the injection molding material contains inorganic fillers from the group consisting of kaolin, clays, mica, wollastonite, calcium silicates, titanium dioxide, zinc borate, quartz, zinc oxide, apatite, talc, aluminum phosphates, ATH, $Mg(OH)_2$, chalk, glass fibers or mineral fibers.

4. The injection molded intumescent, electrical installation system as claimed in claim 3, wherein clays or micas which are present as nanoparticles in the mixture of polymer, intumescent additive and filler are used as the inorganic filler.

5. The injection molded intumescent, electrical installation system as claimed in claim 1, wherein the injection molding material contains dispersants from the group consisting of zinc stearate or calcium stearate, glyceryl stearate, pentaerythrityl tetrastearate, cetyl palmitate, ethylenedistearoyldiamide $C_{14}$-$C_{18}$ fatty alcohols, dicarboxylic esters, fatty amines or paraffins.

6. The injection molded intumescent, electrical installation system as claimed in claim 1, wherein the material thickness is such that it corresponds to the volume of the installation system divided by the product of twice the lateral surface area and the maximum expansion factor, so that the installation system is completely filled with foam by intumescence and a compression factor of 2 is present.

7. The injection molded intumescent, electrical installation system as claimed in claim 1 which is a socket or box.

8. The injection molded intumescent, electrical installation system as claimed in claim 7 which is a conduit box, switch box or junction box.

9. The injection molded intumescent, electrical installation system of claim 7 which is a wall socket.

10. The injection molded intumescent, electrical installation system of claim 7 which is in the form of conduits, angle boxes, branch-Ts, cross boxes, a combination conduit box/switch box, a double conduit box/switch box, a semiflush-mounted conduit box, or a ceiling light connection box, a wall light connection box, a dome box, a double equipment or switch box, a triple equipment box, an equipment conduit box, a junction box/switch box, a transition box, or a universal box.

11. The injection molded intumescent electrical installation system according to claim 1 wherein the bismaleimide is diphenylmethane 4,4-bismaleimide.

12. The injection molded intumescent electrical installation system according to claim 2 wherein the bismaleimide has a melting point below about 2000° C.

13. An injection molded intumescent system which is produced by injection molding a powder mixture comprising bismaleimide and vermicular graphite under the action of heat to form a highly crosslinked polyimide.

* * * * *